United States Patent [19]
Johnston

[11] Patent Number: 5,634,228
[45] Date of Patent: Jun. 3, 1997

[54] MOBILITY AID RAMP

[76] Inventor: Loren M. Johnston, 8255 Burgundy Ave., Cucamonga, Calif. 91730

[21] Appl. No.: 519,722

[22] Filed: Aug. 28, 1995

[51] Int. Cl.$^6$ .......................... B62D 33/033; E01D 15/12
[52] U.S. Cl. .................. 14/69.5; 296/61; 414/537
[58] Field of Search ........................ 14/69.5, 71.1; 414/537; 296/61; 16/DIG. 35

[56] References Cited

U.S. PATENT DOCUMENTS

| | | | |
|---|---|---|---|
| 3,756,440 | 9/1973 | Raap et al. ............................ | 414/537 |
| 3,818,528 | 6/1974 | Petersen .............................. | 414/537 X |
| 4,528,711 | 7/1985 | Packer ................................. | 14/69.5 |
| 5,277,436 | 1/1994 | Frank et al. .......................... | 14/69.5 X |
| 5,325,558 | 7/1994 | Labreche ............................. | 14/69.5 |
| 5,440,773 | 8/1995 | Lentini ............................... | 14/69.5 |
| 5,517,708 | 5/1996 | Baranowski ........................ | 414/537 X |
| 5,538,308 | 7/1996 | Floe .................................... | 414/537 X |

*Primary Examiner*—James Lisehora

[57] ABSTRACT

A mobility aid ramp comprised of an elongated middle ramp comprising a first section and a second section, a pair of elongated outer ramps comprised a first section and a second section, and a plurality of flat rods pivotally coupling the pair of elongated outer ramps on opposing sides of the elongated middle ramp.

1 Claim, 4 Drawing Sheets

MOBILITY AID RAMP

BACKGROUND OF THE INVENTION

1. Field of the Invention

The present invention relates to a mobility aid ramp and more particularly pertains to providing a ramp to allow a transport cart to be loaded into a transport vehicle and then folded up for easy storage with a mobility aid ramp.

2. Description of the Prior Art

The use of pickup truck loading ramps is known in the prior art. More specifically, transport vehicle loading ramps heretofore devised and utilized for the purpose of loading and unloading of off-the-road vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,342,105 to Miles discloses a ramp and endgate for pickup truck.

U.S. Pat. No. 5,156,432 to McCleary discloses a folding gate ramp for pickup trucks.

U.S. Pat. No. 4,795,304 to Dudley discloses a pickup truck loading ramp.

U.S. Pat. No. 4,735,454 to Bernard discloses a pickup truck loading ramp.

U.S. Pat. No. 4,700,421 to Gladnet et al. discloses a ramp for loading small motorized vehicles on pickup trucks.

U.S. Pat. No. 4,098,414 to Abiera discloses a pickup truck loading ramp.

While these devices fulfill their respective, particular objective and requirements, the aforementioned patents do not describe a mobility aid ramp for providing a ramp to allow a transport cart to be loaded into a transport vehicle and then folded up for easy storage.

In this respect, the mobility aid ramp according to the present invention substantially departs from the conventional concepts and designs of the prior art, and in doing so provides an apparatus primarily developed for the purpose of providing a ramp to allow a transport cart to be loaded into a transport vehicle and then folded up for easy storage.

Therefore, it can be appreciated that there exists a continuing need for a new and improved mobility aid ramp which can be used for providing a ramp to allow a transport cart to be loaded into a transport vehicle and then folded up for easy storage and light weight. In this regard, the present invention substantially fulfills this need.

SUMMARY OF THE INVENTION

In the view of the foregoing disadvantages inherent in the known types of pickup truck loading ramps now present in the prior art, the present invention provides an improved folding ramp for three or four wheel transport carts. As such, the general purpose of the present invention, which will be described subsequently in greater detail, is to provide a new and improved mobility aid ramp and method which has all the advantages of the prior art and none of the disadvantages.

To attain this, the present invention essentially comprises an elongated middle ramp having a planar lower portion, two side portions, and open end portions. The two side portions are secured to opposing side edges of the planar lower portion. The elongated middle ramp further comprises a first section and a second section. The first section is hingedly coupled to the second section. The device contains a pair of elongated outer ramps. Each of the outer ramps has a planar lower portion, two side portions, and open end portions. The two side portions are secured to opposing side edges of their respective planar lower portions. Each of the elongated outer ramps further comprise a first section and a second section. Each first section is hingedly coupled to its respective second section. Each planar lower portion has a plurality of non-skid surfaces disposed thereon. The device contains a plurality of flat rods. Each of the rods pivotally couples the pair of elongated outer ramps on opposing sides of the elongated middle ramp. Each of the rods has a first end coupled to a lower surface of the planar lower portion of the middle ramp and a second end coupled with a lower surface of the planar lower portion of one of the pair of outer ramps. The device contains a pair of ramp extension portions. Each of the ramp extension portions is secured to an open end portion of a respective elongated outer ramp. Each of the ramp extension portions is adapted for coupling with a lowered tailgate of a pickup truck, or bumper sill of a van or station wagon. A middle ramp extension portion is selectively coupled to the open end portions of the elongated middle ramp. The middle ramp extension portion is adapted for coupling with a lowered tailgate of a pickup truck, or bumper or sill of a van or station wagon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mobility aid ramp which has all the advantages of the prior art pickup truck loading ramps and none of the disadvantages.

It is another object of the present invention to provide a new and improved mobility aid ramp which may be easily and efficiently manufactured and marketed.

It is a further object of the present invention to provide a new and improved mobility aid ramp which is of durable and reliable construction.

An even further object of the present invention is to provide a new and improved mobility aid ramp which is susceptible of a low cost of manufacture with regard to both materials and labor, and which accordingly is then susceptible of low prices of sale to the consuming public, thereby making such a mobility aid ramp economically available to the buying public.

Still yet another object of the present invention is to provide a new and improved lightweight mobility aid ramp which provides in the apparatuses and methods of the prior art some of the advantages thereof, while simultaneously overcoming some of the disadvantages normally associated therewith.

Even still another object of the present invention is to provide a new and improved mobility aid ramp for providing a ramp to allow a transport cart to be loaded into a transport vehicle and then folded up for easy storage.

Lastly, it is an object of the present invention to provide a new and improved mobility aid ramp comprised of an elongated middle ramp comprising a first section and a second section, a pair of elongated outer ramps comprised a first section and a second section, and a plurality of flat rods pivotally coupling the pair of elongated outer ramps on opposing sides of the elongated middle ramp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
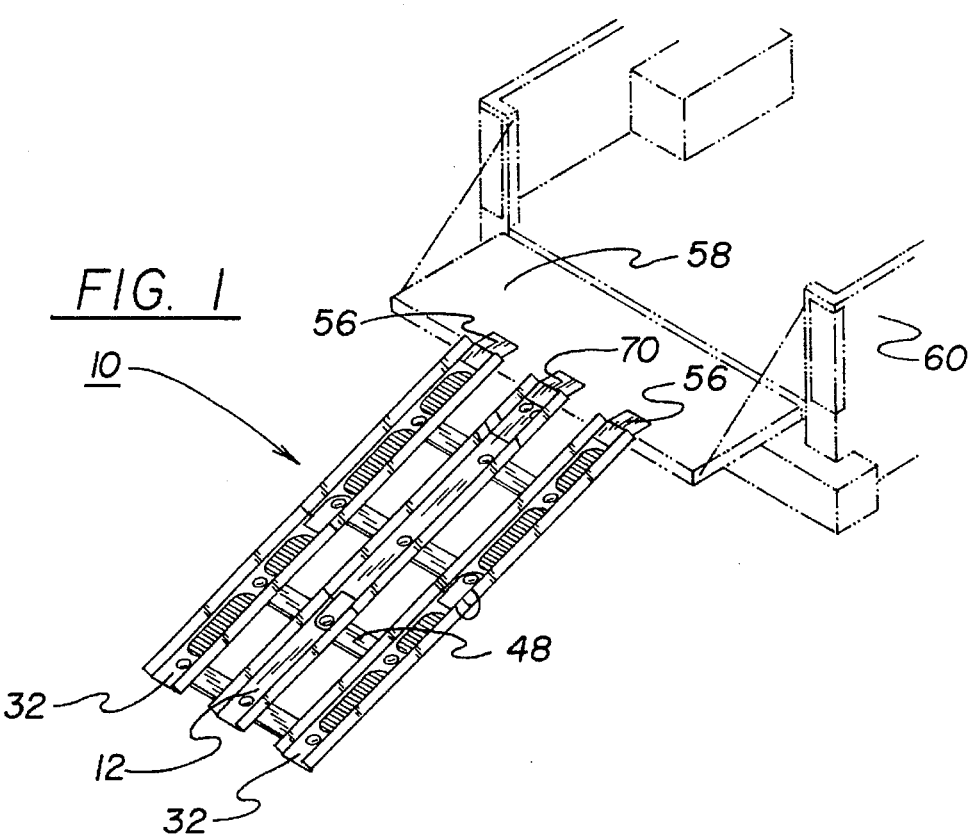
FIG. 1 is a perspective view of the preferred embodiment of the mobility aid ramp constructed in accordance with the principles of the present invention.
Figure 2:
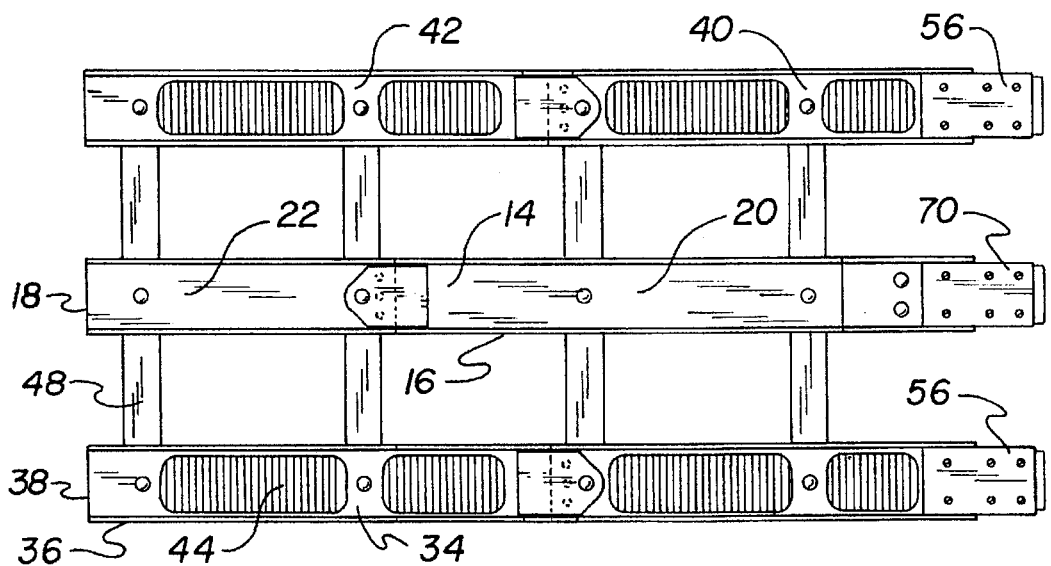
FIG. 2 is a plan view of the preferred embodiment of the present invention.
Figures 3, 4:
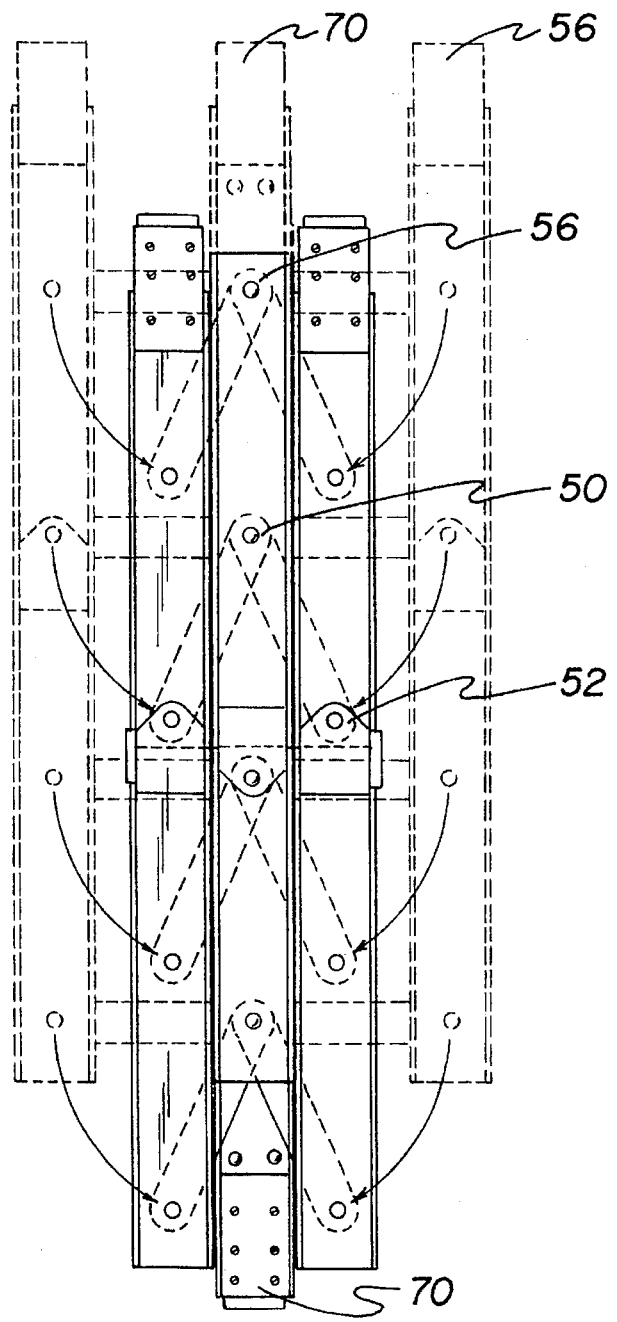
FIG. 3 is a side elevation view of the present invention.
FIG. 4 is a plan view of the present invention illustrating its foldability.
Figure 5:
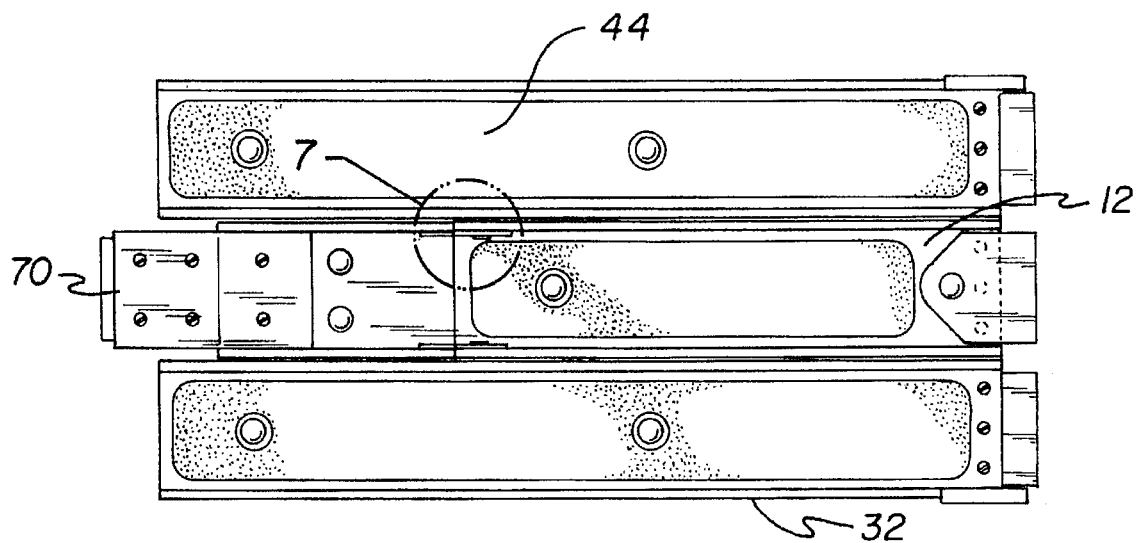
FIG. 5 is a plan view of the present invention in a folded configuration.

With reference now to the drawings, and in particular, to FIG. 1 thereof, the preferred embodiment of the new and improved mobility aid ramp embodying the principles and concepts of the present invention and generally designated by the reference number 10 will be described.

Specifically, it will be noted in the various Figures that the device relates to a new and improved mobility aid ramp for providing a ramp to allow a transport cart to be loaded into a transport vehicle and then folded up for easy storage. In its broadest context, the device consists of an elongated middle ramp, a pair of elongated outer ramps, a plurality of rods, a pair of ramp extension portions, and a middle ramp extension portion. Such components are individually configured and correlated with respect to each other so as to attain the desired objective.

The first component of the device 10 is an elongated middle ramp 12. The elongated middle ramp 12 has a planar lower portion 14, two side portions 16, and open end portions 18. The two side portions 16 are secured to opposing side edges of the planar lower portion 14 thereby forming a channel in which a wheel can travel safely therealong. The elongated middle ramp 12 further comprises a first section 20 and a second section 22. The first section 20 is hingedly coupled to the second section 22. A hinge 24 comprised of a first plate 26 secured to a lower portion of the planar lower portion 14 of the first section 20 and a second plate 28 secured to a lower portion of the planar lower portion 14 of the second section 22. The hinge 24 allows for the middle ramp 12 to be folded in half with the first section 20 and second section 22 folded against one another. The first section 20 having a length greater than the second section 22.

The second component of the device 10 is a pair of elongated outer ramps 32. Each of the outer ramps 32 has a planar lower portion 34, two side portions 36, and open end portions 38. The two side portions 36 are secured to opposing side edges of their respective planar lower portions 34. Each of the elongated outer ramps 32 further comprise a first section 40 and a second section 42. Each first section 40 is hingedly coupled to its respective second section 42. A hinge 24 comprised of a first plate 26 secured to a lower portion of the planar lower portion 34 of the first section 40 and a second plate 28 secured to a lower portion of the planar lower portion 34 of the second section 42. The hinge 24 allows for the outer ramps 32 to be folded in half with the first section 40 and second section 42 folded against one another. Each planar lower portion 34 has a plurality of non-skid surfaces 44 disposed thereon. The non-skid surfaces 44 provide added protection so that a transport cart traveling atop the outer ramps 32 will not slide causing accidents.

Figure 6:
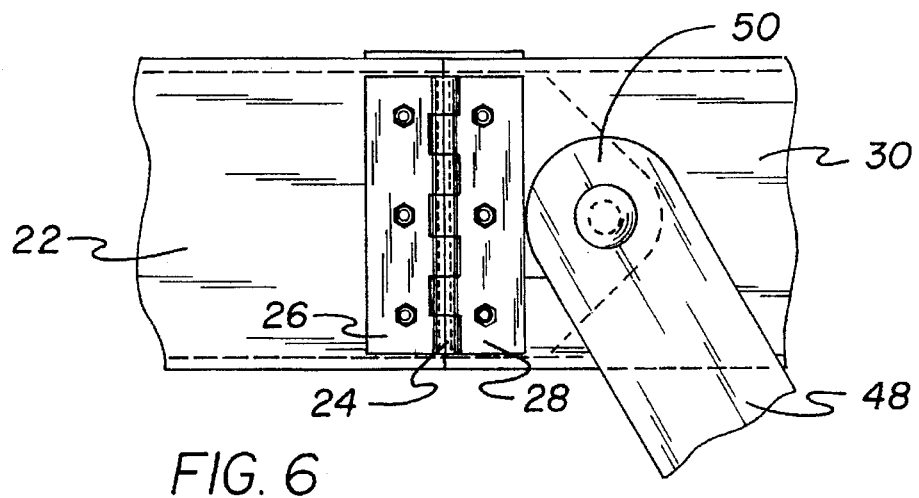
FIG. 6 is a plan view of the hinged coupling of one of the ramps of the present invention.
Figure 7:
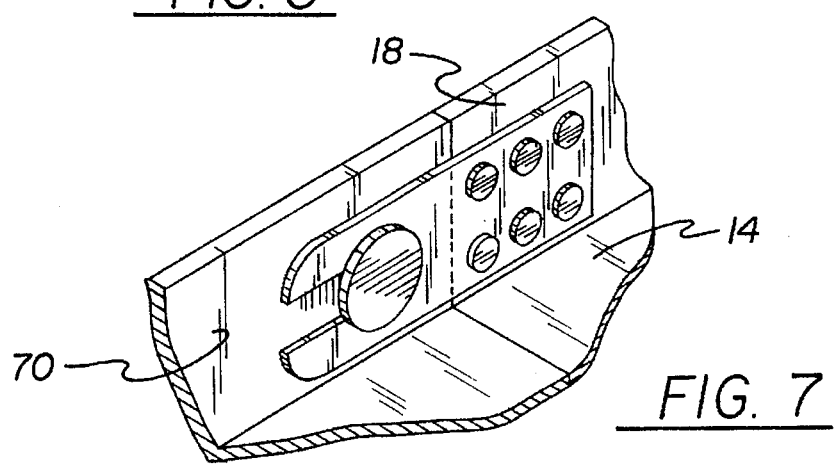
FIG. 7 is a fragmentary perspective view of the ramp extension portion coupled with the middle ramp.
Figure 8:
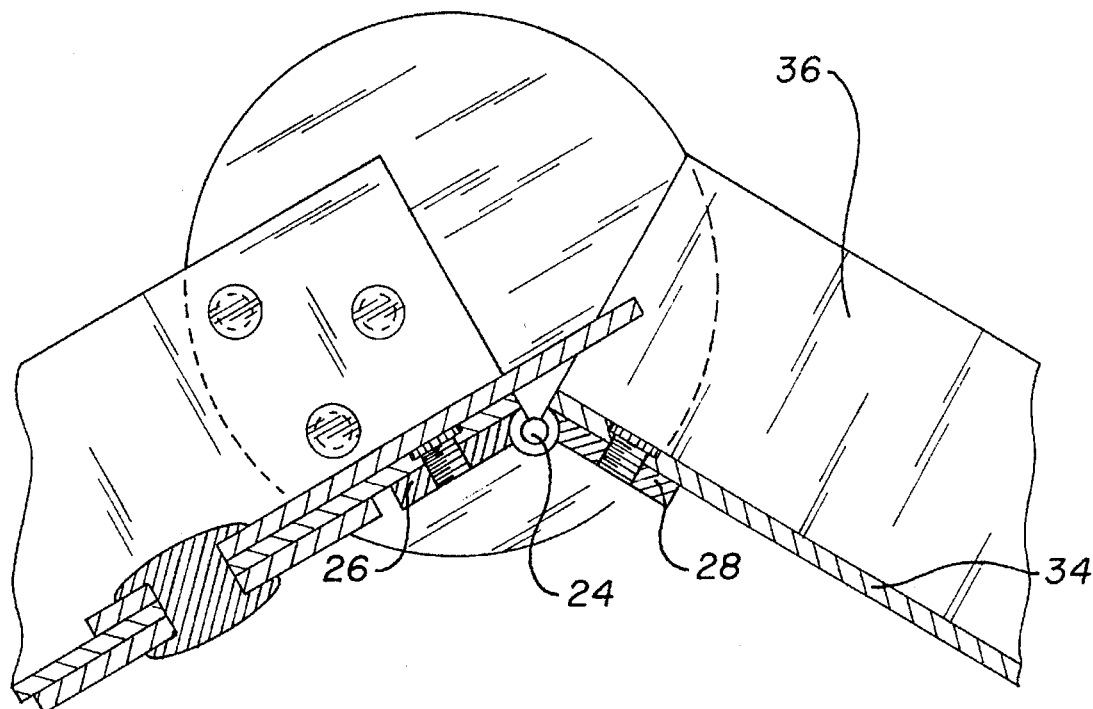
FIG. 8 is a side view of the hinged coupling of the present invention.
Figure 9:
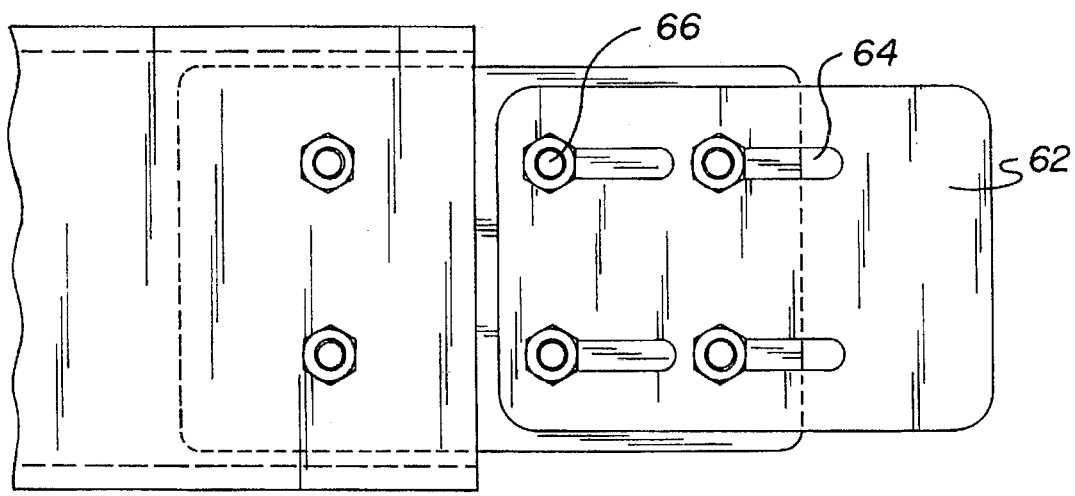
FIG. 9 is a bottom view of the tailgate extension portion of the present invention.

The third component of the device 10 is a plurality of rods 48. Each of the flat-surfaced rods 48 pivotally couples the pair of elongated outer ramps 32 on opposing sides of the elongated middle ramp 12. Each of the rods 48 has a first end 50 coupled to a lower surface of the planar lower portion 14 of the middle ramp 12 and a second end 52 coupled with a lower surface of the planar lower portion 34 of one of the pair of outer ramps 32. The plurality of rods 48 are positioned along the entire length of the outer ramps 32 and the middle ramp 12. The plurality of rods 48 permit the outer ramps 32 to be pivoted inwardly so as an innermost side edge 36 thereof is positioned against a respective side edge 16 of the middle ramp 12 thereby allowing the device 10 to be folded into a folded configuration. Once the plurality of rods 48 are extended outwardly, they lie in an orthogonal relationship between the middle ramp 12 and the pair of outer ramps 32. The rods are positioned to act as opening limitation when in contact with the hinge. See FIG. 6, #28 and #48.

The fourth component of the device 10 is a pair of ramp extension portions 56. Each of the ramp extension portions 56 is secured to an open end portion 38 of a respective elongated outer ramp 32. Each of the ramp extension portions 56 is adapted for coupling with a lowered tailgate 58 of a pickup truck 60. Each of the ramp extension portions 56 is angled downwardly so as to lay flat on the tailgate 58 as the device 10 is angled upwardly from the ground to allow the transport cart to smoothly enter a truckbed of the pickup truck 60. Each of the ramp extension portions 56 has an extending portion 62. The extending portion 62 has slots 64 formed therethrough thereby allowing the extending portion 62 to be adjusted so as to accurately couple with the lowered tailgate 58 or other opening of a transport vehicle. Screws 66 can be loosened within the slots 64 to allow the extending portion 62 to be lengthened or shortened.

The last component of the device 10 is a middle ramp extension portion 70. The middle ramp extension portion 70 is selectively coupled to the open end portions 18 of the elongated middle ramp 12. The middle ramp extension portion 70 is adapted for coupling with a lowered tailgate 58 of a pickup truck 60. The middle ramp extension portion 70 can be removed to be used at either of the open end portions 18 of the middle ramp 12 allowing for smaller compact storage. The middle ramp extension portion 70 has an extending portion 62. The extending portion 62 has slots 64 formed therethrough thereby allowing the extending portion 62 to be adjusted so as to accurately couple with the lowered tailgate 58. Screws 66 can be loosened within the slots 64 to allow the extending portion 62 to be lengthened or shortened. The middle ramp extension portion 70 is adapted for use on a middle wheel of a transport cart. Once the middle ramp extension portion 70 and the pair of ramp extension portions 56 are positioned on the lower tailgate 58, a transport cart is then driven up the device 10. If the transport cart is equipped with a front middle wheel and two rear wheels, the front middle wheel will travel upon the middle ramp 12 with the two rear wheels travelling upon the two outer ramps 32. A four-wheeled transport cart will not require the use of the middle ramp 12 which will stabilize all three ramps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A mobility aid ramp for providing a ramp to allow a transport cart to be loaded into a transport vehicle and then folded up for easy storage comprising, in combination:

an elongated middle ramp having a planar lower portion, two side portions, and open end portions, the two side portions secured to opposing side edges of the planar lower portion, the elongated middle ramp further comprising a first section and a second section, the first section being hingedly coupled to the second section;

a pair of elongated outer ramps, each of the outer ramps having a planar lower portion, two side portions, and open end portions, the two side portions secured to opposing side edges of their respective planar lower portions, each of the elongated outer ramps further comprising a first section and a second section, each first section being hingedly coupled to its respective second section, each planar lower portion having a plurality of non-skid surfaces disposed thereon;

a plurality of rods, each of the rods pivotally coupling the pair of elongated outer ramps on opposing sides of the elongated middle ramp, each of the rods having a first end coupled to a lower surface of the planar lower portion of the middle ramp and a second end coupled with a lower surface of the planar lower portion of one of the pair of outer ramps;

a pair of ramp extension portions, each of the ramp extension portions secured to an open end portion of a respective elongated outer ramp, each of the ramp extension portions being adapted for coupling with a lowered tailgate of a pickup truck or bumper sill of a van or station wagon; and a middle ramp extension portion being selectively coupled to the open end portions of the elongated middle ramp, the middle ramp extension portion being adapted for coupling with a lowered tailgate of a pickup truck.

* * * * *